(12) United States Patent
Gilson

(10) Patent No.: US 11,424,778 B2
(45) Date of Patent: Aug. 23, 2022

(54) APPLICATION BASED RECONFIGURING OF REMOTE CONTROL TRANSMISSION RATE BEHAVIOR

(71) Applicant: TIVO CORPORATION, San Jose, CA (US)

(72) Inventor: Ross Gilson, Philadelphia, PA (US)

(73) Assignee: TIVO CORPORATION, San Jose, CA (US)

( * ) Notice: Subject to any disclaimer, the term of this patent is extended or adjusted under 35 U.S.C. 154(b) by 0 days.

(21) Appl. No.: 16/711,074

(22) Filed: Dec. 11, 2019

(65) Prior Publication Data

US 2020/0244296 A1 Jul. 30, 2020

Related U.S. Application Data

(63) Continuation of application No. 12/843,959, filed on Jul. 27, 2010, now Pat. No. 10,601,457.

(51) Int. Cl.
*H04B 1/20* (2006.01)
*G06F 3/023* (2006.01)
(Continued)

(52) U.S. Cl.
CPC ........... *H04B 1/202* (2013.01); *G06F 3/0231* (2013.01); *G06F 3/038* (2013.01); *G08C 17/02* (2013.01);
(Continued)

(58) Field of Classification Search
CPC .. G06F 1/3259; G06F 2203/0383; G06F 3/02; G06F 3/0227; G06F 3/023; G06F 3/0231;
G06F 3/0238; G06F 3/038; G06F 3/04886; H04N 21/42204; H04N 21/42215; H04N 21/42216; H04N 21/42224;
(Continued)

(56) References Cited

U.S. PATENT DOCUMENTS 4,106,011 A 8/1978 Melanson et al.
4,263,582 A * 4/1981 Dumbovic ............. H03M 11/02
341/26
(Continued)

OTHER PUBLICATIONS

U.S. Appl. No. 12/843,959, filed Jul. 27, 2010, Ross Gilson.
U.S. Appl. No. 14/996,915, filed Jan. 15, 2016, Ross Gilson.

*Primary Examiner* — Keith L Crawley
(74) *Attorney, Agent, or Firm* — Haley Guiliano LLP

(57) ABSTRACT

Aspects of the disclosure relate to a remote control which may include one or more buttons configured to provide input to the remote control upon being activated, a transmitter for transmitting data, a receiver for receiving data, a processor and memory storing computer executable instructions that, when executed, cause the two-way remote control to perform a method for configuring repeat transmission behavior of one or more of the buttons of the two-way remote control. Further, the receiver may be configured to receive data from a device configured to be controlled by the remote control and the data may include instructions for configuring the repeat transmission behavior of the one or more buttons of the two-way remote control. Additionally, the two-way remote control may configure the repeat transmission behavior of the one or more buttons of the two-way remote control based on the data received from the device.

21 Claims, 8 Drawing Sheets

(51) Int. Cl.
*G06F 3/038* (2013.01)
*G08C 17/02* (2006.01)
*G08C 23/04* (2006.01)
*H04L 12/28* (2006.01)
*H04N 21/422* (2011.01)

(52) U.S. Cl.
CPC ............ *G08C 23/04* (2013.01); *H04L 12/282* (2013.01); *H04N 21/42224* (2013.01); *H04N 21/42225* (2013.01); *G08C 2201/20* (2013.01); *G08C 2201/30* (2013.01); *H04N 21/42215* (2013.01)

(58) Field of Classification Search
CPC ....... H04N 21/42225; H04N 21/42226; G08C 17/02; G08C 23/04; G08C 2201/20; G08C 2201/30; G08C 2201/51; H04L 12/2814; H04L 12/282; H04B 1/202
See application file for complete search history.

(56) References Cited

U.S. PATENT DOCUMENTS

| | | | |
|---|---|---|---|
| 4,323,888 A | 4/1982 | Cole | |
| 4,490,055 A | 12/1984 | Johnson et al. | |
| 5,438,331 A | 8/1995 | Gilligan et al. | |
| 5,551,701 A | 9/1996 | Bouton et al. | |
| 5,557,299 A | 9/1996 | Maynard et al. | |
| 5,581,243 A * | 12/1996 | Ouellette | G06F 3/0481 345/168 |
| 5,714,983 A | 2/1998 | Sacks | |
| 6,071,194 A | 6/2000 | Sanderson et al. | |
| 6,124,804 A | 9/2000 | Kitao et al. | |
| 6,225,916 B1 * | 5/2001 | Sugimoto | G08C 19/28 340/12.17 |
| 6,492,977 B1 | 12/2002 | Marshall | |
| 6,538,595 B1 | 3/2003 | Tucker et al. | |
| 6,567,016 B1 | 5/2003 | Rajamani et al. | |
| 6,803,857 B1 * | 10/2004 | Uehara | G08C 19/00 340/12.31 |
| 6,907,273 B1 | 6/2005 | Smethers | |
| 6,909,378 B1 | 6/2005 | Lambrechts et al. | |
| 6,963,937 B1 | 11/2005 | Kamper et al. | |
| 6,970,098 B1 | 11/2005 | Adams et al. | |
| 7,656,464 B2 | 2/2010 | Pfiffer | |
| 8,031,270 B1 | 10/2011 | Wisniewski et al. | |
| 8,264,381 B2 | 9/2012 | Odell et al. | |
| 8,477,059 B1 * | 7/2013 | Howard | H04N 21/4221 341/176 |
| 9,235,986 B2 | 1/2016 | Drimusz et al. | |
| 2002/0055384 A1 | 5/2002 | Armstrong | |
| 2002/0075161 A1 | 6/2002 | Raffel et al. | |
| 2002/0083153 A1 | 6/2002 | Sweatt et al. | |
| 2003/0043198 A1 | 3/2003 | Delpuch | |
| 2003/0151589 A1 | 8/2003 | Bensen et al. | |
| 2004/0064597 A1 | 4/2004 | Trewin | |
| 2004/0070491 A1 | 4/2004 | Huang et al. | |
| 2004/0157558 A1 * | 8/2004 | Ishiwatari | H04B 1/202 455/41.2 |
| 2004/0255042 A1 | 12/2004 | Megeid | |
| 2005/0057521 A1 | 3/2005 | Aull et al. | |
| 2005/0083173 A1 | 4/2005 | Konupek et al. | |
| 2005/0104867 A1 | 5/2005 | Westerman et al. | |
| 2006/0066570 A1 * | 3/2006 | Trifilo | G06F 3/038 345/157 |
| 2006/0152496 A1 | 7/2006 | Knaven | |
| 2007/0001894 A1 | 1/2007 | Konno | |
| 2007/0109325 A1 | 5/2007 | Eveleigh | |
| 2007/0112940 A1 | 5/2007 | Morisawa et al. | |
| 2008/0059990 A1 | 3/2008 | Marr et al. | |
| 2008/0158148 A1 | 7/2008 | Madonna et al. | |
| 2009/0013110 A1 | 1/2009 | Novotney et al. | |
| 2009/0054069 A1 | 2/2009 | Calnan, III et al. | |
| 2009/0224955 A1 | 9/2009 | Bates et al. | |
| 2010/0100359 A1 | 4/2010 | Podoloff et al. | |
| 2010/0138673 A1 | 6/2010 | Hatambeiki et al. | |
| 2010/0171700 A1 | 7/2010 | Sharan et al. | |
| 2010/0302168 A1 | 12/2010 | Giancarlo et al. | |
| 2011/0128228 A1 | 6/2011 | Van | |
| 2011/0181386 A1 | 7/2011 | Lee et al. | |
| 2011/0197214 A1 | 8/2011 | Burton et al. | |
| 2011/0258542 A1 * | 10/2011 | Kenney | G06F 3/04847 715/702 |
| 2012/0026097 A1 | 2/2012 | Gilson | |
| 2015/0208013 A1 | 7/2015 | Friedrich | |

\* cited by examiner

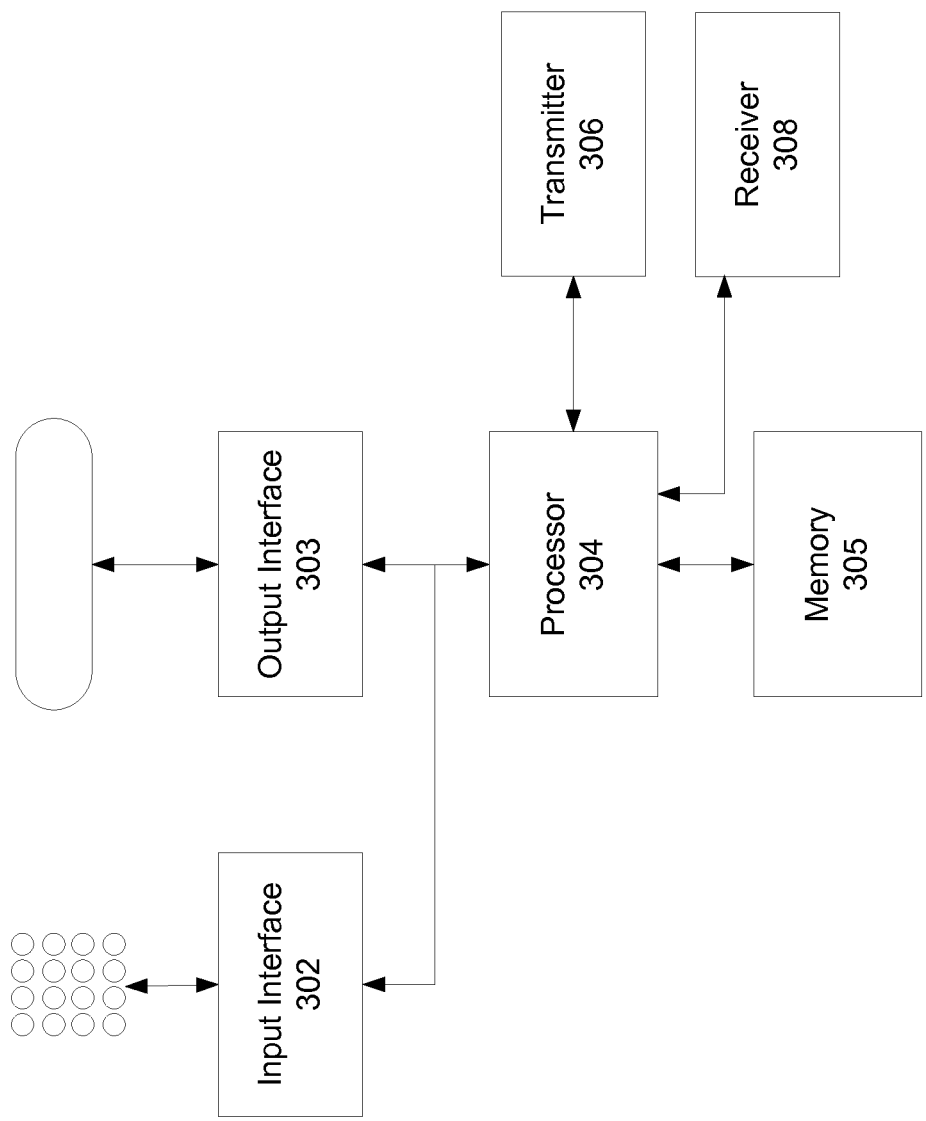

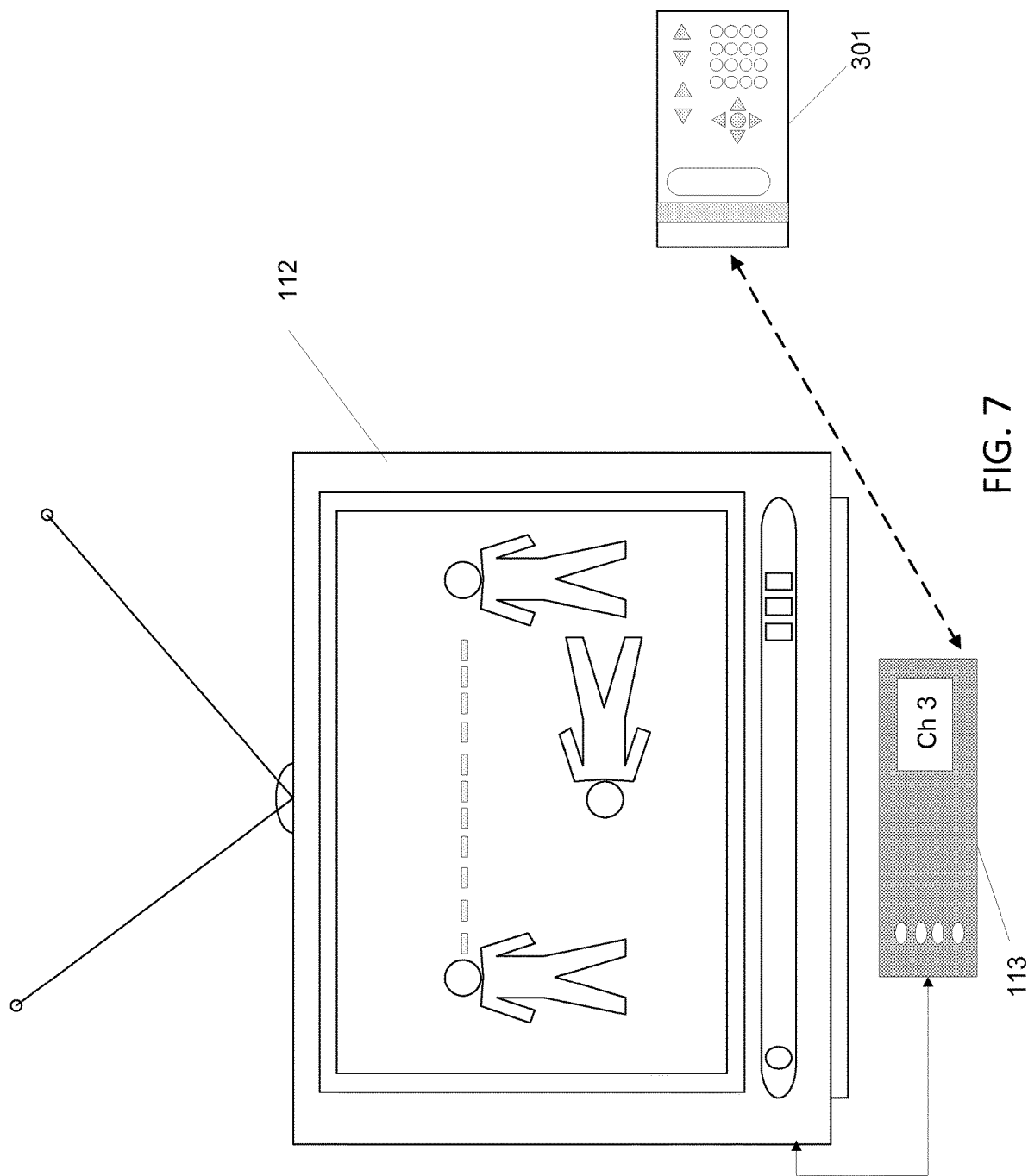

APPLICATION BASED RECONFIGURING OF REMOTE CONTROL TRANSMISSION RATE BEHAVIOR

CROSS REFERENCE TO RELATED PATENT APPLICATION

This application claims priority under 35 U.S.C. § 120 as a Continuation of U.S. Non-Provisional Application No. 12/843,959 filed on Jul. 27, 2010, which is herein incorporated by reference in its entirety.

FIELD OF DISCLOSURE

Aspects of this disclosure may relate to a remote control. Particular aspects of this disclosure may relate to configuring the repeat transmission behavior of a remote control.

BACKGROUND

Remote controls may be used for a variety of the purposes. For example, remote controls may be used to control televisions (e.g., high-definition televisions), monitors, MP3 players, audio receivers, radios, communication devices, personal computers, media players, digital video recorders (DVRs), game playing devices, set top boxes (STBs), security systems, household appliances, etc. Conventional remote controls may be configured to transmit data by sending transmissions (e.g., Radio Frequency (RF) transmissions, Infrared (IR) transmissions, etc.) which control the respective devices. Further, devices which are to be controlled by the transmissions from the remote control, may include, be electronically connected to or otherwise in communication with, receivers that receive the data transmissions from the remote control.

Some conventional remote controls are designed such that upon a button of the remote control being pressed and held, a single transmission is transmitted. Other conventional remote controls are designed such that upon a button of the remote control being pressed and held, repeated transmissions are transmitted (e.g., transmissions may be repeated indefinitely or transmissions may be repeated for a limited amount of time to avoid draining the battery if, for example, someone is sitting on the remote control). Such a repeated transmission may be useful for commands such as volume control and channel changing. While these remote control features are beneficial, there remains an ever-present need for even more beneficial and even more convenient remote control functionality.

SUMMARY

Hence, some aspects of the disclosure relate to methods and systems for selectively controlling the repeatability of a transmission from a remote control upon a function (e.g., pressing a button) of the remote control being activated (e.g., being depressed a single time, held in a depressed state or otherwise activated).

For example, aspects of the disclosure may relate to a remote control which may include one or more buttons configured to provide input to the remote control upon being activated, a transmitter for transmitting data, a receiver for receiving data, a processor and memory storing computer executable instructions that, when executed, cause the remote control to perform a method for configuring held button behavior of one or more of the buttons of the remote control. Further, the receiver may be configured to receive data from a device configured to be controlled by the remote control and the data may include instructions for configuring the repeat transmission behavior of the one or more buttons of the remote control. Additionally, the remote control may configure the held button behavior of the one or more buttons of the remote control based on the data received from the device. Further, the remote control may configure the repeated button press rate behavior of the one or more buttons of the remote control based on known characteristics or limits of the controlled device.

Further aspects of the disclosure may relate to a system for configuring repeat transmission behavior for one or more buttons of a remote control which may include a two-way remote control and a device to be controlled by the remote control. The two-way remote control may include one or more buttons configured to provide input to the two-way remote control upon being activated, a transmitter for transmitting data, a receiver for receiving data, a processor and memory storing computer executable instructions that, when executed, cause the two-way remote control to perform a method for configuring the repeat transmission behavior of one or more of the buttons of the two-way remote control. Further, the device to be controlled by the remote control, may include a transmitter for transmitting data, a receiver for receiving data, a processor and memory storing computer executable instructions that, when executed, cause the device to perform a method for transmitting data to the two-way remote control wherein the data instructs the two-way remote control to configure the repeat transmission behavior of one or more buttons of the two-way remote control. Further, the two-way remote control may be configured to receive data from the device and, based on the data, configure the repeat transmission behavior of one or more buttons of the two-way remote control.

Additional aspects of the disclosure may relate to a method for configuring the repeat transmission behavior of one or more buttons of a remote control which may include electronically receiving data from a device configured to be controlled by the remote control and configuring repeat transmission behavior of one or more buttons of the remote control based on the electronically received data.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which:

FIGS. 5-7 illustrate example use scenarios for different modes of remote control behavior.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
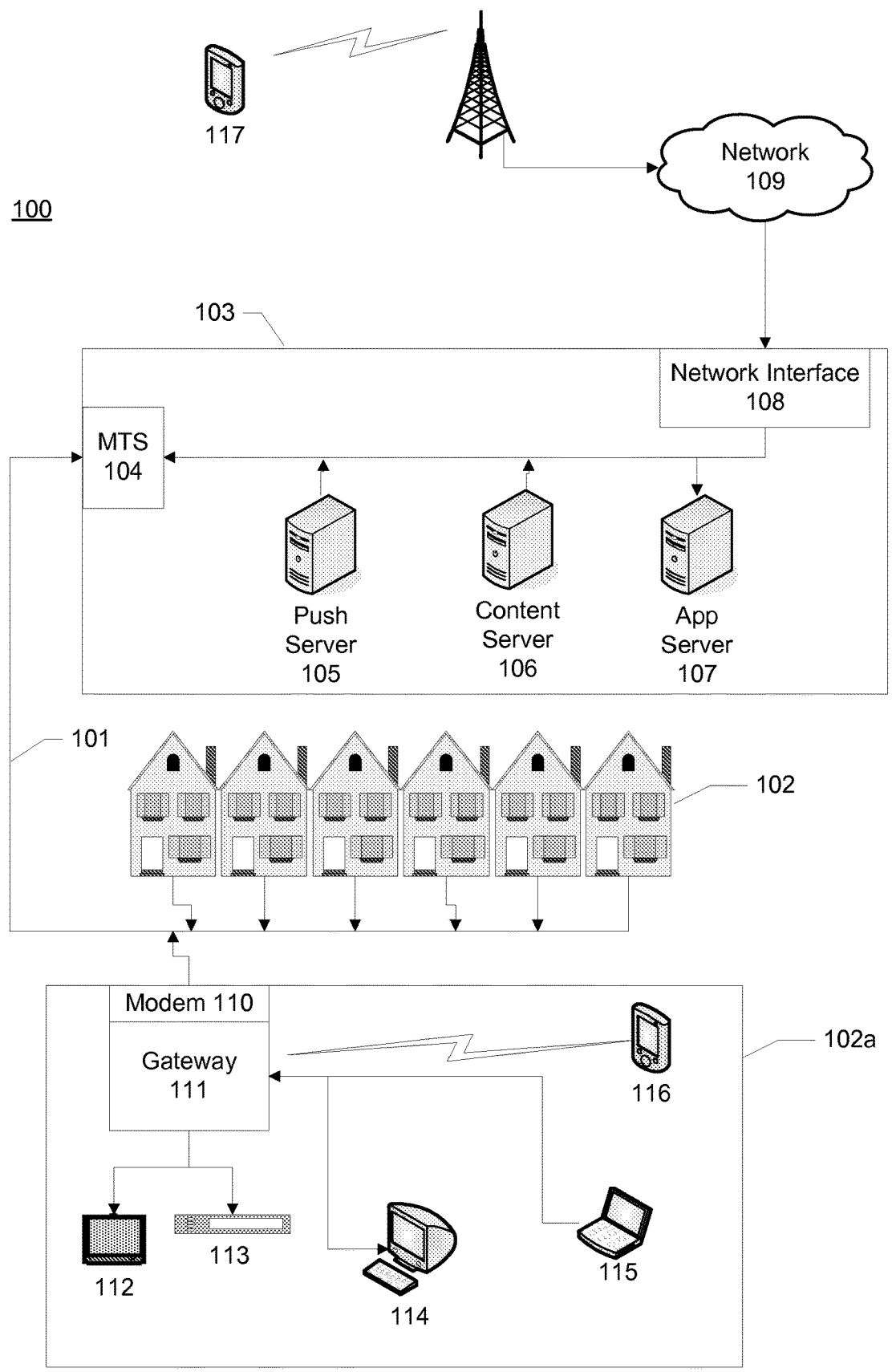
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a modem termination system (MTS) 104, such as a cable modem termination system (CMTS), which may be a computing device configured to manage communications between devices on the network of lines 101 and backend devices such as servers 105-107 (to be discussed further below). The MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
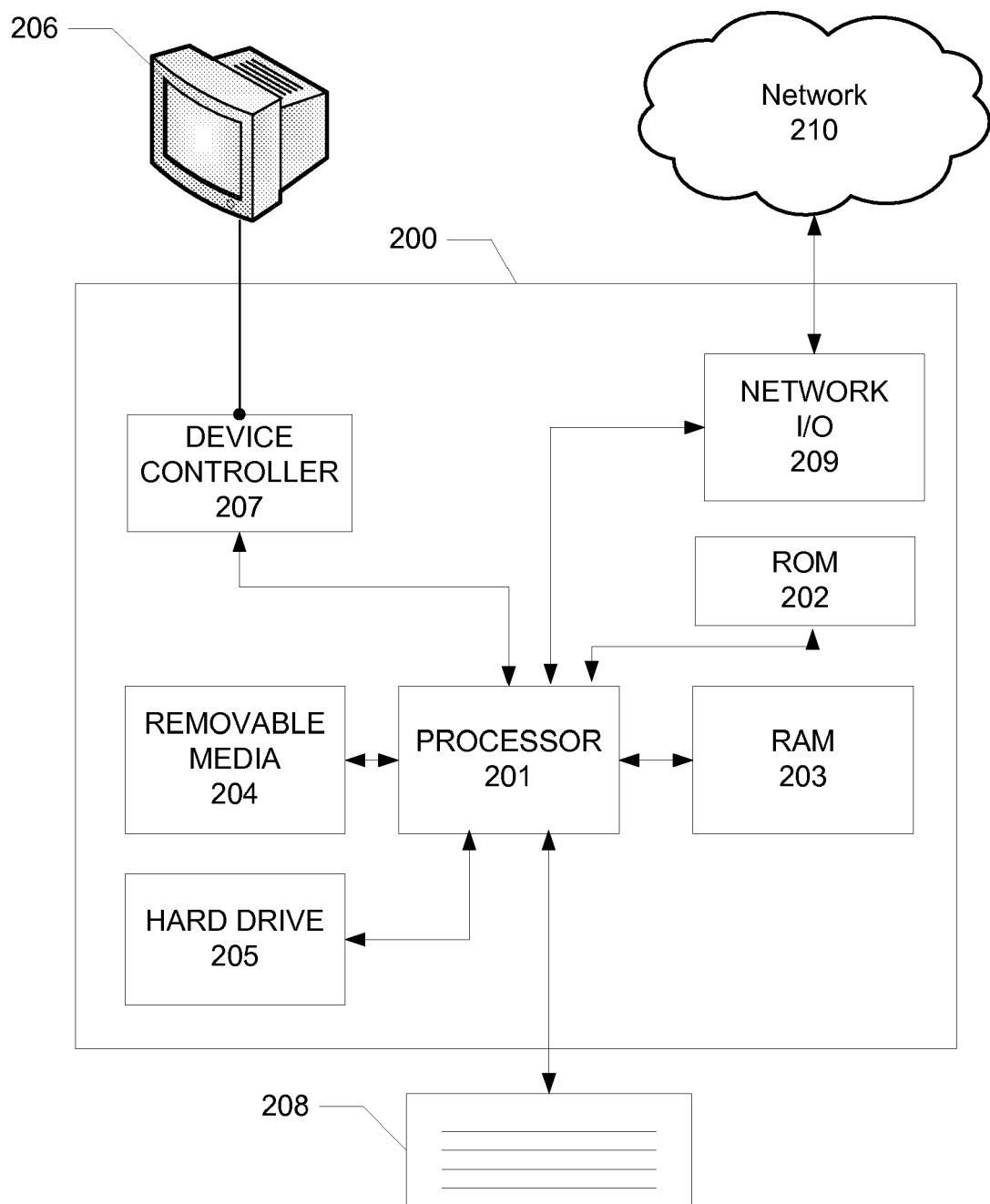
FIG. 2 illustrates an example hardware platform on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Various features described herein offer improved remote control functionality, for example, to users accessing content from the central office 103. For example, one such user may be a viewer who is watching a television program being transmitted from the central office 103 or any content provider. Particular aspects of the disclosure may relate to transmissions between a remote control and a gateway 111. Such and other aspects of the disclosure will be described in detail below.

Figure 3A:
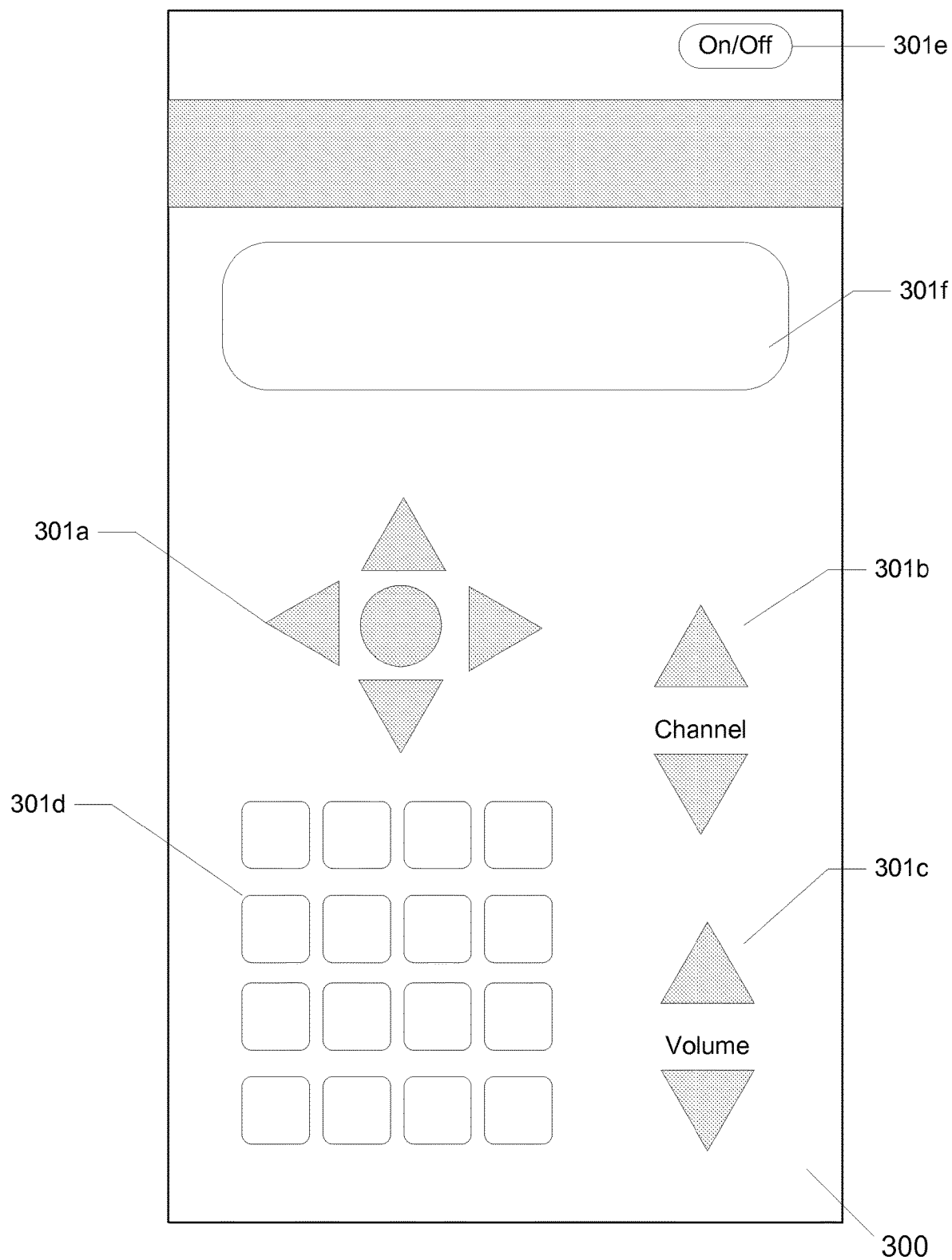
FIGS. 3A & B illustrate an example external and internal embodiment of a remote control according to one or more aspects of the disclosure.

FIG. 3A shows an illustrative remote control 300 according to aspects of the disclosure. The remote control 300 may include an input interface, such as a touch sensitive device (e.g., a touch screen), one or more buttons, etc. for inputting commands to the remote control 300. For example, as seen in FIG. 3A, the remote control 300 may include one or more buttons 301 which may function as the input interface. Buttons can include directional buttons 301*a*, channel up/down buttons 301*b*, volume up/down buttons 301*c*, numeric keypad buttons 301*d*, power on/off button 301*e*, and any other desired input. The buttons may be push-type electrical switch or contact buttons, or they may be user interface buttons displayed on a screen (e.g., on a touch-sensitive display of a mobile telephone or the touchpad 301*f* shown in FIG. 3A). Buttons may refer to any input device on a remote control.

The remote control 300 may be embodied as a dedicated remote control (e.g., a television remote, STB remote, etc.) or a multifunction remote (e.g., universal remote, mobile device with remote control functionality, personal computer with remote control software, etc.).

FIG. 3B illustrates internal components of an example remote control 300. The remote control may include an input interface 302, such as connections to the various buttons 301, touchscreen, etc., as well as an output interface 303, which can include display screens, light-emitting diodes, speakers, etc. The remote may include a processor 304 (e.g., a microprocessor), which may execute instructions stored on a computer-readable memory 305 (e.g., FLASH RAM) to perform any of the functions described herein. Alternatively, the processor may be external to the remote. The remote may also include an emitter or transmitter 306, which can be an infrared, radio frequency, or any other desired circuit configured to transmit control signals. The remote may also include a receiver 308, which can be an infrared, radio frequency, or any other desired circuit configured to receive control signals. Further, it is noted that a transceiver (e.g., a wireless transceiver) may be used to perform the above described functions of the transmitter 306 and receiver 308.

In operation, the processor 304 may receive input from the input interface. For example, when the buttons 301 are activated (e.g., pressed, touched, held down, etc.), the buttons 301 may provide signals to the processor 304. Further, the processor 304 may process the signal and cause the transmitter 306 to create and send one or more transmissions (e.g., Infrared (I.R.) or Radio Frequency (RF) transmissions) based on the input received from the input device. For example, if a "channel up" button 301*b* is pressed, the processer 304 may cause the transmitter 306 to create and send a transmission intended for gateway 111 which contains instructions that will cause the gateway 111 to increase the channel when the transmission is received and interpreted by the gateway 111.

The processor 304 may include a timing circuit, or clock, to be used for sending transmissions. In some embodiments the timing circuit or clock may be utilized to send multiple transmissions over a predetermined amount of time when the input device is activated. For example, if a "channel up" button is pressed and held, the processor 304 may initially send the channel up command, and if the button remains held down for another half-second, the processor 304 can send another channel up command, or a series of channel up commands. The clock may be used for that purpose, and a further example of this is described further below.

It is noted that the configuration of the remote control 301 shown in FIG. 3 is merely illustrative and provided to assist the reader in understanding the disclosure. The configuration shown in FIGS. 3A and 3B is not meant to be limiting and, in fact, other configurations may be used as desired. For example, the arrangement of the buttons, size and shape of the remote control, particular buttons included, etc. may be varied as desired. Also, it is noted that remote controls 300 according to aspects of the disclosure may be two-way remote controls. For example, remote controls 300 according to aspects of the disclosure may be configured to transmit data to a device and, also, receive data from the device to which the data is transmitted. For example, transmitter 306 may include a wireless (IR, RF, etc.) receiver as well.

According to aspects of the disclosure, the remote control 300 may be selectively controlled to function according to various states of operation, or modes. In particular, repeat transmission behavior (e.g., response to a user holding a button down or continuing to press/select it) of one or more buttons 301*a* of the remote control 301, may be varied, customized and/or otherwise selectively controlled. For example, holding down a given button while in one mode may cause transmission of commands to occur at a different rate or frequency from when the same button is held down in another mode. In some embodiments, the transmission behavior of a button may also be selectively variable between sending repeated transmissions if the button 301*a* of the remote control is held in a depressed state and sending a single transmission even if the button 301*a* of the remote control is held in a depressed state. Further, in some embodiments, the transmission behavior of a button 301*a* may also be selectively variable to send a predetermined amount of repeated transmissions over a predetermined amount of time. For example, if the receiving device (e.g., gateway 111) will receive and interpret a maximum of three transmissions from the remote control 300 during one second, then the processor 304 of the remote control 300 may instruct the transmitter 306 to send a maximum of three transmissions per second when the button 301a is held in a depressed state, or if the user happens to press the button at a faster rate (e.g., pressing it 5 times per second would still only result in sending 3 transmissions per second). Hence, as demonstrated by the illustrative examples above, according to aspects of the disclosure, the repeat transmission behavior of the button 301a (e.g., the held button behavior), may be varied, customized and otherwise selectively controlled.

Figure 4:
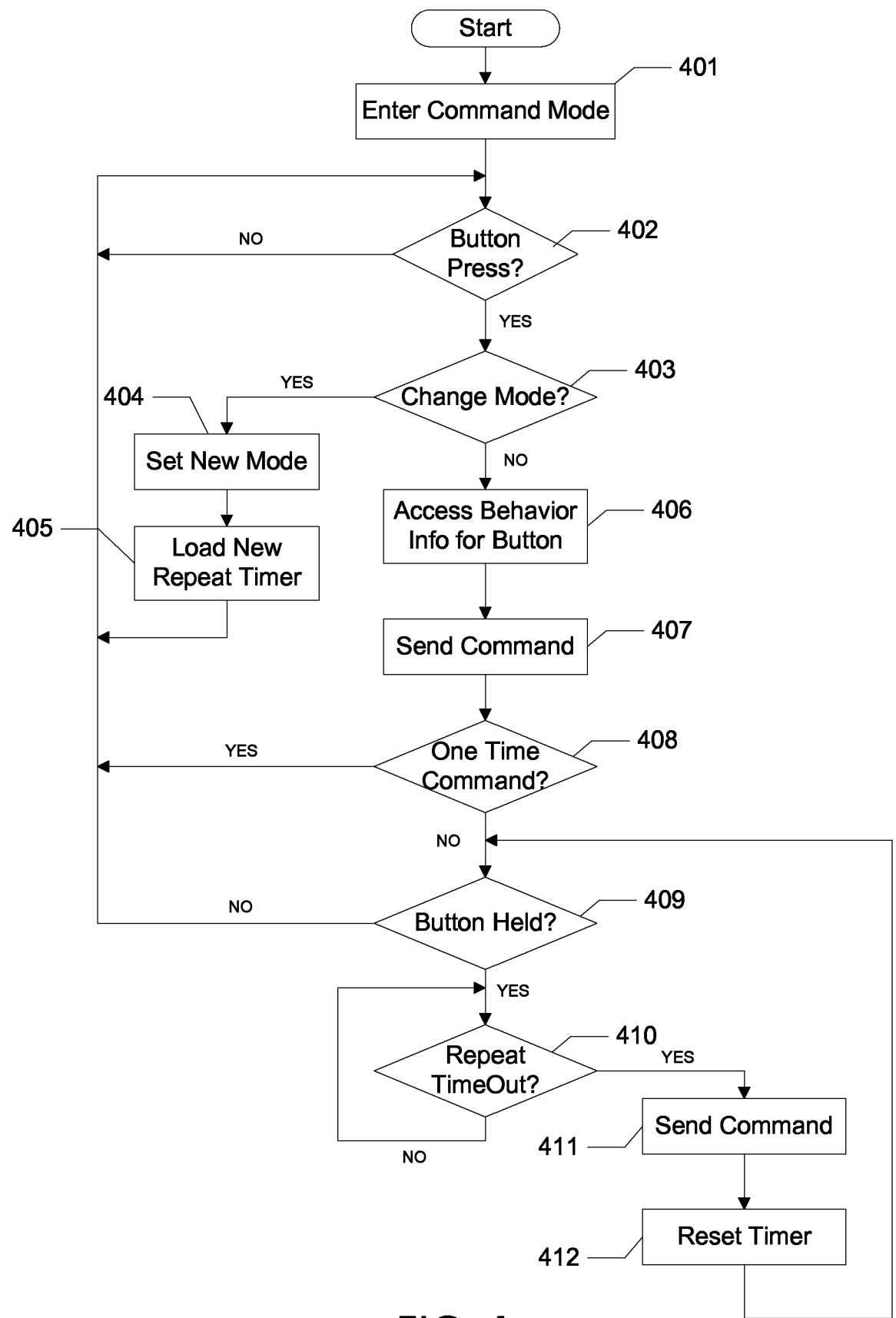
FIG. 4 illustrates an example process of remote control behavior.

FIG. 4 illustrates an example process of button behavior. In step 401, the remote control may first enter into a command mode, indicating that the remote is ready to accept inputs. Entering the command mode can involve different processes for different remote controls. For example, if the remote control 300 is a dedicated STB remote control, then simply inserting batteries into the device may cause the processor 304 to boot up, executing operating system code stored in memory 305. That operating system code can include different sets of instructions for responding to different types of button presses. For example, the instructions may include a list of button identifiers corresponding to the signals received from input interface 302, and the button identifiers may be accompanied by instructions for response, or a code to be transmitted. For example, pressing the number '5' may result in the processor 304 instructing the transmitter 306 to send a digital infrared signal. The signal may be of any desired type and pattern. For example, the remote control's clock may be configured to send pulses that are 50 ms wide, and the number '5' button may result in sending a pulse of digital 0101 (5 in binary).

In addition to identifying a signal or pulse pattern to be sent, the instruction set for a given button may also define repeat press parameters. The repeat press parameters may include a timeout value to indicate how much time must pass before a command will be resent if the button remains held. For example, if the timeout value for the volume UP button is 500 ms, then the remote would transmit the first volume UP command when the button is pressed, and then send it again if the button remains pressed half a second later. As noted above, different buttons can have different timeout values. For example, a volume UP button may send a command to incrementally increase the volume when pressed once and released. Holding the volume UP button down may cause the command (which incrementally increases the volume) to be sent repeatedly each time the timeout value is exceeded. Since a user who wants to change the volume may wish to have it change quickly, the timeout value for a volume UP button may be relatively short (e.g., 500 ms). In this way, the command (which incrementally increases the volume) is sent relatively frequently during the time period that the volume UP button is held down and, therefore, the volume is increased quickly. In contrast, a directional UP key may send a command which allows a user to scroll through text (e.g., text in an EPG which describes a television program). Holding the directional UP key down may cause the command (which allows the user to scroll through text) to be sent repeatedly each time the timeout value is exceeded. However, a user who is pushing a directional UP key to scroll through text might want it to scroll slow enough to allow time to read the text, so the user would not want to send repeated direction UP commands as fast as, for example, the volume UP button. Therefore, the timeout value for a directional UP key may be relatively longer (e.g., 1 second). In this way, the command (which allows the user to scroll through text) is sent relatively infrequently during the time period that the directional UP key is held down (compared to the volume button). Therefore, scrolling through the text commences relatively slowly even when the direction UP button is held down so as to prevent the user from accidently scrolling through the text too quickly.

Another parameter may indicate whether the button is considered a one-time command. A one-time command may be a command that need only be sent once for each button press, regardless of how long the button is held. For example, a power ON button might be a one-time command, since repeatedly sending an ON command might not be needed. Other parameters may be used as well desired.

If the remote control 300 is a multifunction device, such as a mobile telephone, then entering the command mode may further include instructing the mobile telephone to load a remote control software application. That application may contain similar instruction sets to that described above, as needed to allow the multifunction device to operate as a remote control.

Once the remote 300 is ready to accept button presses, or other types of input, the process may proceed to step 402, and await such a press. When a button has been pressed, the process may determine in step 403 whether the button press requires a change in operating mode. A change in mode may occur, for example, when a user wishes to switch a multifunction remote control from controlling one device (e.g., a television) to another (e.g., a stereo). The mode may also be changed if a given device (e.g., a gateway) is used for a different application (e.g., switching between watching television to playing a video game may cause the remote control to use its buttons differently). Detecting the mode change can be as simple as determining whether the user has pressed a predefined button for the mode (e.g., by pressing a "Watch TV" button), or by selecting a mode through an onscreen menu. The mode change need not be initiated by the remote control, and can instead be initiated by a different device. For example, detecting the mode change may include the remote control 300 receiving data through a receiver on the remote control 300 from the device which is to be controlled by the remote control 300. The data may contain instructions that cause the processor 304 to configure the remote control 300 according to a particular mode. By way of example, the device may be a gateway, such as the gateway 111 described above, and the gateway may receive a message from a friend, inviting the user to play a game or watch a show, and the display of that message may place the control into a different mode (e.g., a mode suitable for responding to the message). That incoming message may cause the gateway 111 to automatically send data (e.g., in the form of a transmission) to a receiver in the remote control 300 which causes the processor 304 to reconfigure the remote control 300 according to a video game mode from the television mode. It is noted that, as demonstrated in the above example, changing between various modes does not necessarily have to be initiated through the remote control 301.

Another example of detecting a mode change may include a DVR reminder occurring when the user is viewing a television program, wherein the DVR reminder may cause the gateway 111 to automatically send data to the remote control 300 which causes the processor 305 to configure the remote control 300 according to a DVR mode. An additional example of detecting a mode change may include a message (e.g., an email, text message, voicemail or other electronic message from a friend) occurring through the gateway 111 and displaying on the television screen when the user is viewing a television program. The message may cause a particular application (e.g., a DVR) to begin operating and the particular application may cause the gateway 111 to automatically send data to the remote control 300 which causes the processor 305 to configure the remote control 300 according to the mode related to that particular application. Sending these messages to the remote can be accomplished using the remote's own receiver (e.g., for a two-way remote).

If a new mode is desired, then the process may set the new mode in step 404. Setting the new mode may involve loading new command instructions sets from the memory 305 (or an external memory) into registers or cache of the processor 304, to alter the behavior of the buttons when pressed. For example, the new instruction sets may define new pulse patterns to be sent when different buttons are pressed.

Another new parameter may be a new repeat timer. Step 405 illustrates the optional step of loading the new repeat timer for a button (or multiple timers for multiple buttons). For example, the directional arrows 301a may be used to scroll text on screen when viewing a text description of a program, move a cursor through an onscreen electronic program guide (EPG) when the EPG is displayed, or move an onscreen avatar through a video game. Each of these three different activities may involve different modes for the directional arrows, and the arrows may have different repeat timers. The video game mode may want a very short timer (e.g., 10 ms), since the user may need to deftly and quickly press different arrow keys to move the avatar in the game, and the game needs to be promptly responsive to held buttons. Scrolling through onscreen text when viewing a description, however, can afford to be slower, allowing the user time to read the text, so a longer repeat timer may be set for that mode (e.g., 500 ms). Other modes, such as navigating the EPG, may use yet different times (e.g., an EPG navigation may be somewhere between the action video game and the leisurely reading of the description, perhaps 250 ms). The value may be a time measurement (e.g., 10 ms, 250 ms, 500 ms, etc.), and whichever new timer is needed, the new value may be stored into one or more memory registers used by the processor 304 (as will be described below).

If the button press was not a change in mode, then the process may proceed to step 406, and access behavior information for the button that was pressed. This may involve, for example, identifying the button based on the signal received from the input interface 302, and using it to look up behavior information stored in memory 305. The behavior information may be, for example, a table listing buttons by identifier and one or more instruction sets to perform when the button is pressed. As noted above, the instruction set may identify a pulse sequence to be transmitted, as well as repeat behavior and time.

In step 407, the processor 304 may instruct the transmitter 306 to send the requisite signal. For example, if the button behavior called for sending a bit value of "0110", then the transmitter may send infrared pulses to correspond with this value.

In step 408, the processor 304 may determine whether the button was a one-time command button. This may be done, for example, by consulting the button's behavior information to determine if it is a one-time command (e.g., if a one-time command flag is set, or if the repeat timer is set to infinity, etc.).

If it is a one-time command, then the process may return to step 402 and await the next button press. If it is not a one-time command, then the process may proceed to step 409, and determine whether the button remains held. If it does not, the process may return to step 402. If it remains held, then the process may proceed to step 410, and determine whether the button has been held long enough to exceed the timeout value from the button's behavior information. To support this functionality, the remote control may start a new clock timer in step 402, and compare the clock timer value with the timeout value in step 410.

When the repeat time has passed, the process may proceed to step 411 and send the button's command again. This may involve the transmitter 306 sending the same infrared pulse again. The process may then reset its hold count timer for the current button press in step 412, and return to step 409 to determine if the button remains held.

Figure 5:
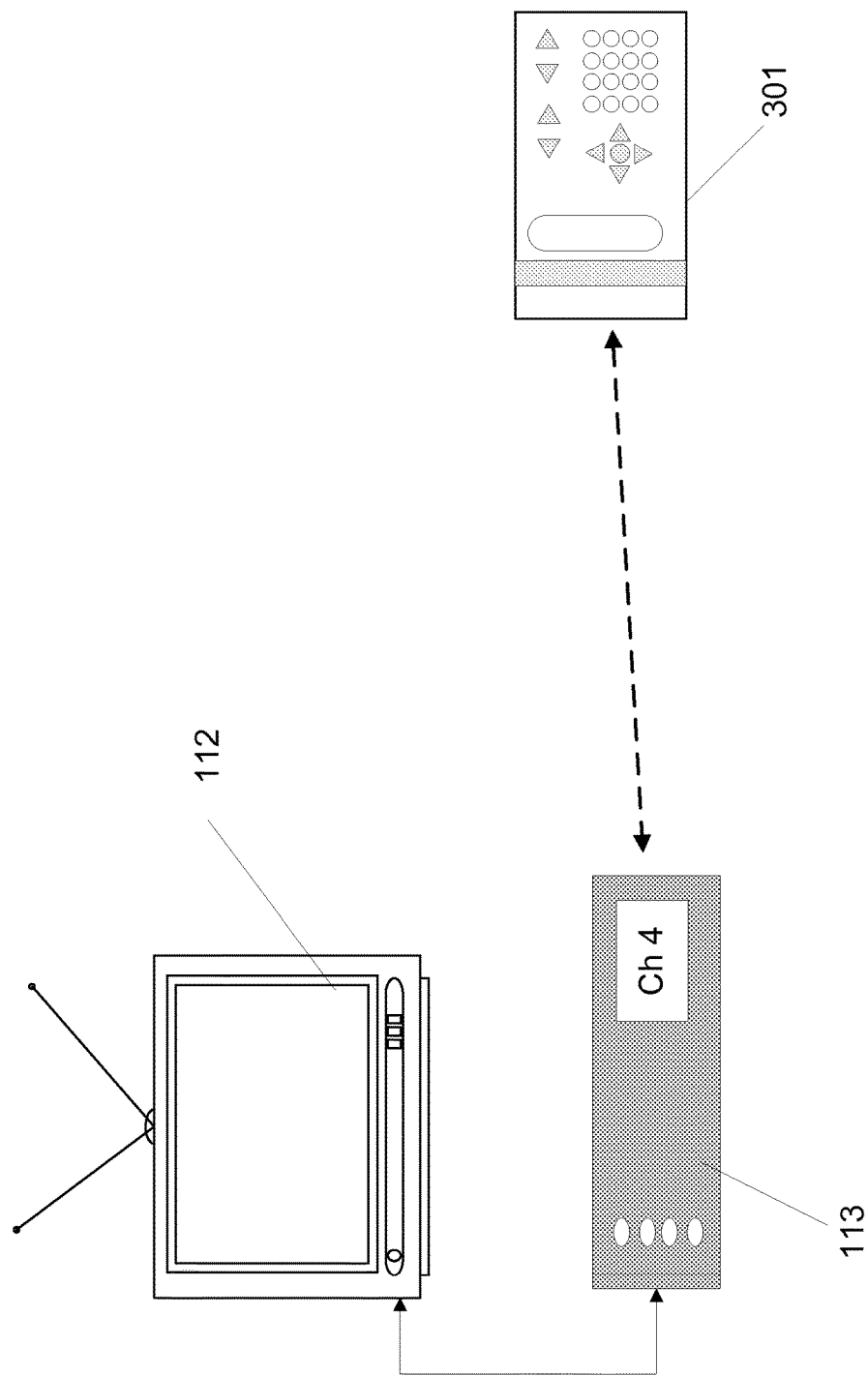

According to aspects of the disclosure, the device that receives commands from the remote control may also send data to the remote to inform the remote control of the mode of operation. For example, a gateway may report a software application currently running for the user (e.g., a video game, an EPG, display of a text description, etc.). The remote control 300 may be a two-way remote control. FIG. 5 is a diagram which schematically illustrates such aspects of the disclosure. As seen in FIG. 5, the remote control 300 transmits data to and receives data from a content accessing device, in this example a STB 113 but which can be any other device or the display device 112. According to aspects of the disclosure, transmissions between the remote control 300 and the controlled user device (or any other receiver) may be RF transmissions, IR transmissions, Internet transmissions, or the like. Further, as seen in FIG. 5, the STB 113 is in communication with (and may be a part of) a display device, television 112 such that the STB 113 and the television 112 can transmit data to, and receive data from, each other. This connection may be via a variety of methods including cables (e.g., HDMI cables, AV cables, etc.), wireless connections, etc.

The data received from the controlled user device may configure the remote control 300 according to a particular mode based on the particular application which the user device is currently operating. Therefore, the repeat transmission behavior of the buttons 301 of the remote control 300 may be varied and selectively controlled based on data from the user device which relates to the particular application which the user device is currently operating. Examples of different applications which may be run or operated on the user device are provided to assist the reader in understanding various features of the disclosure. It is noted that such applications are merely examples and discussed for illustrative purposes.

Figure 6:
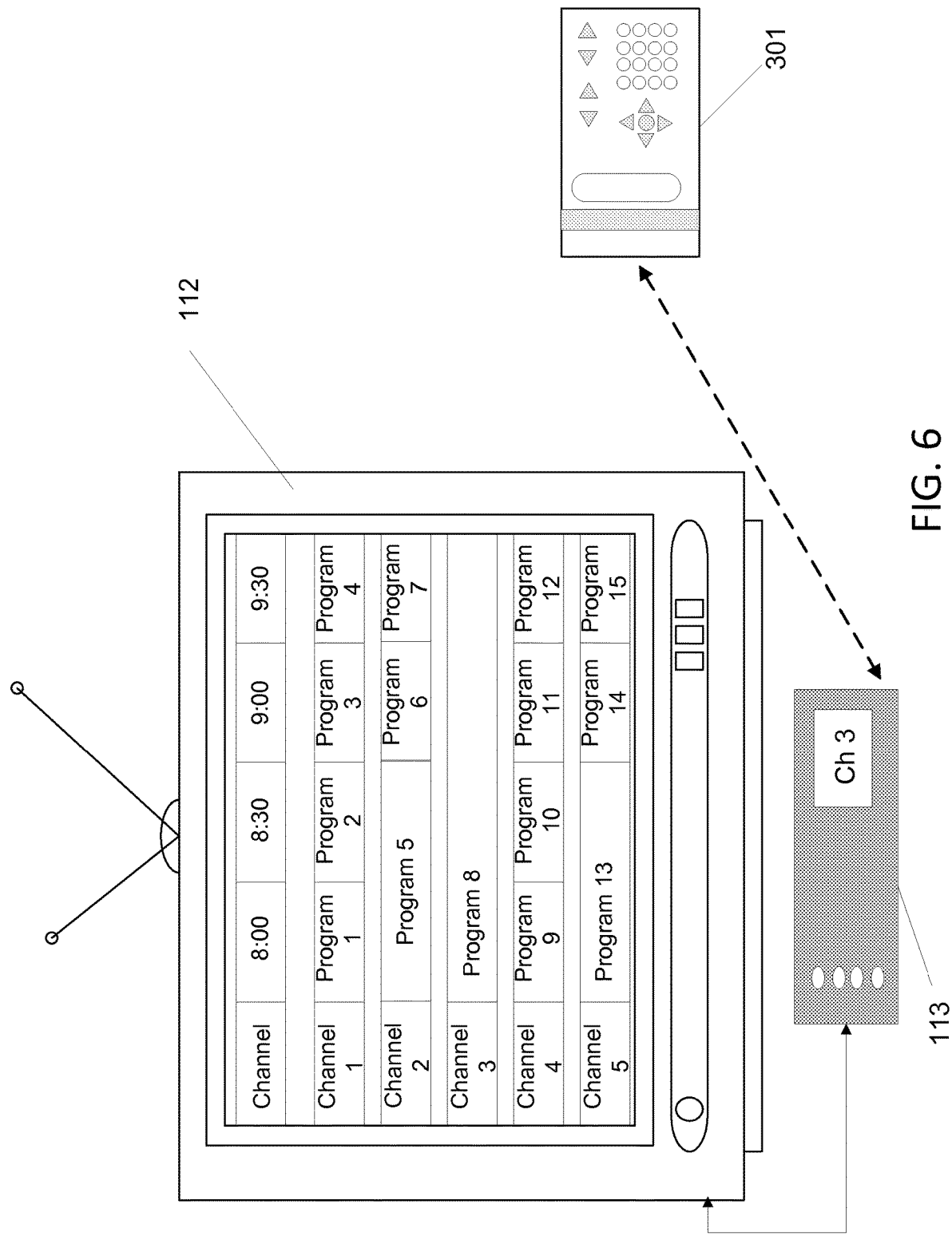

As noted above, an EPG may be an example of an application operated on the user device. For example, FIG. 6 illustrates an embodiment of the disclosure, wherein a program guide is being operated. For example, as seen in FIG. 6, the program guide is displayed on the television 112. According to aspects of the disclosure, when the program guide is being operated on the user device, the user device may transmit data to the remote control 300 (e.g., automatically transmit data to the remote control 300 upon the program guide application being launched) to configure the buttons 301 of the remote control according to a particular mode. In a program guide, it may be desired to move or scroll through the channels listed in the program guide at a pace that allows the user to comfortably read the contents scrolling by. Therefore, the particular mode the user device configures the remote control 300 to operate in when the user device is running the program guide (e.g., the "program guide" mode), may include configuring the "channel up" and "channel down" buttons 301 of the remote control to use a repeat timeout value of 250 ms. This timeout value can be previously stored in the remote's memory 305, such that the user device need only send a signal identifying the new mode. Alternatively, the user device can send the behavior information profile (or parts thereof) as well, allowing the remote control to dynamically load new timeout values for buttons provided by a device being controlled.

Further, in a program guide, there may be no need for the "SELECT" or "ENTER" buttons to send repeated transmissions if such buttons are held in a depressed state. When entering the EPG mode, the new button behavior may set a one-time command flag for those buttons.

According to aspects of the disclosure, a video game may be another example of an application operated on the user device. For example, FIG. 7 illustrates an embodiment of the disclosure, wherein a video game is being operated on the user device. For example, as seen in FIG. 7, the video game is displayed on the television 112. According to aspects of the disclosure, when the video game is being operated on the user device, the user device may transmit data to the remote control 301 (e.g., automatically transmit data to the remote control 300 upon the video game application being launched) to configure the buttons 301 of the remote control 300 according to a particular mode (e.g., the "video game" mode). In a video game, the "SELECT" or "ENTER" buttons may correspond to a "fire" or "attack" feature for a character in the video game which the user is controlling, and may need to be repeatedly transmitted when the button is held (e.g., to repeatedly attack). Hence, in the "video game" mode, it may be desirable for the character in the video game to fire or attack quickly and repeatedly. This is in contrast to the above described "program guide" mode in which a single transmission (not repeated transmissions) is desired when the "SELECT" or "ENTER" buttons are pressed and held. Accordingly, when entering the video game mode, the button behavior information for these buttons may undo the one-time command flag (e.g., set it to false), and may specify a repeat timeout (e.g., 20 ms).

Further, in a video game, the "directional arrow" buttons may control the movement for a character in the video game. Hence, in such an embodiment, it may be desirable for the character in the video game to move quickly and repeatedly, but maybe at a different rate than the firing or attacking. Therefore, the particular mode the user device configures the remote control to operate in when the user device is running the video game, may include configuring the "directional arrow" buttons 301a of the remote control to send repeated transmissions every 200 ms when the "directional arrow" buttons 301 of the remote control are held in a depressed state.

Additionally, in the video game, there may be no need for the "channel up" and "channel down" buttons 301b of the remote control to send repeated transmissions when the "channel up" and "channel down" buttons 301b of the remote control are held in a depressed state, and those buttons may instead be needed for a one-time function (e.g., pausing the game, or skipping a level), and their button behavior values may be set accordingly.

Further, as mentioned above, according to aspects of the disclosure, a DVR may be included in the user device. The DVR application may include various additional functions. For example, the DVR application may include a scheduling function for recording programs, advising of conflicts between programs scheduled to be recorded, playing back recorded content (play, fast-forward, rewind, pause, etc.).

Those various functions may have their own desired button behavior (e.g., holding down fast-forward may use a shorter repeat timeout value, and may even have a timeout value that shrinks the longer the button is held).

Therefore, in a playback function of the DVR application, it may be desired to fast-forward, rewind, use slow motion on, play or pause the recorded program. It is noted that the directional buttons (as represented in the embodiment of the remote control 300 shown in FIG. 3 as the triangular up, down, left, right, buttons 301a and, potentially, the circular button 301a in the center of the triangular buttons 301a) 301a may be utilized to activate the fast forward, rewind, slow motion, play and pause features. As noted above, in the playback function of the DVR application, if such buttons are held in a depressed state, the speed of the function corresponding the depressed directional button may be increased or decreased. For example, if the right directional button fast forwards the recording, then holding the right directional button may send repeated transmissions and thereby cause the speed of the fast forwarding to increase. Similarly, if the left directional button rewinds the recording, then holding the left directional button may send repeated transmissions and thereby cause the speed of the rewinding to increase. Hence, the DVR mode that the user device configures the remote control 300 to operate in when the user device is operating the playback function of the DVR application, may include configuring the directional buttons to send repeated transmissions upon the buttons being pressed and held in a depressed state.

Other buttons of the remote control 300 may be selectively configured as desired. By dynamically configuring the repeat transmission behavior of buttons 301 based on the application being operated on the user device, the efficiency of the remote control 300 and the convenience of the user may be increased.

The discussion above notes the use of a repeat timer for throttling the rate at which commands are repeatedly sent. Another parameter may be a count on the number of times that a command will be sent. For example, it may be desirable to repeatedly send a command, but to do so no more than 5 times. Such a repeat limit may be included among the button behavior parameters described above.

Further, the repeat transmission behavior of the buttons 301a of the remote control 300 may be configured in other ways as well. For example, the repeat transmission behavior of the buttons 301 of the remote control 300 may be varied in instances other than either being depressed a single time or held down indefinitely. For example, as mentioned above, the repeated button press rate behavior of the one or more buttons of the remote control 301 may be selectively reconfigured as desired. For example, if the button 301a is pressed a particular amount of times (e.g., four times) during a predetermined amount of time (e.g., one second), the processor 304 of the remote control 300 may control the number of transmissions sent over the predetermined amount of time so that the number of transmissions sent may be different from the number of times the button 301a is pressed over the predetermined amount of time. For example, if the remote control 300 has been configured to an EPG mode and the user device which controls the EPG will receive and interpret a maximum of three transmissions from the remote control 300 during one second, then the processor 304 of the remote control 300 may instruct the transmitter 306 to send a maximum of three transmissions per second, even when the button 301a is pressed more than three times in a second.

Additionally, the repeat transmission behavior of the buttons 301a of the remote control 300 may be configured in other ways as well. For example, the repeat transmission behavior of the buttons 301 of the remote control 300 may be varied based on the remaining battery life of the remote control. For example, if the battery life in the remote control 300 is below a predetermined threshold, the processor 304 may change the repeat transmission behavior of the buttons 301 of the remote control 300 to conserve power. This conservation of power may be achieved, for example, by curtailing the sending of repeat transmissions for a held button state. For example, instead of transmitting a command every 300 ms when a button is held, the remote could simply transmit one command transmission for when the button is first pressed (also informing the receiver of the low power state), and send a second transmission when the button is released.

Additionally, the repeat transmission behavior of the buttons 301*a* of the remote control 300 may be configured in other ways as well. For example, the repeat transmission behavior of the buttons 301 of the remote control 300 may be varied based on other buttons 301*a* that are pressed simultaneously. For example, if in a particular mode, two buttons have different repeat transmission behaviors and are pressed simultaneously, the transmissions from the buttons may be combined or otherwise modified. For example, the "volume up" button may be held down from 0 seconds to 5 seconds and in the particular mode in which the remote control 300 is currently configured may have a repeat rate of every 300 ms (e.g., transmissions are sent at 300 ms, 600 ms, 900 ms, 1200 ms, 1500 ms, 1800 ms 2100 ms, etc.). Further, the "channel up" button may be held down from 2 seconds to 4 seconds and in the particular mode in which the remote control 300 is currently configured may have a repeat rate of every 150 ms. Therefore, at the 2 second mark, the "channel up" button would send a transmission, but the transmission may include the same data as would have been in the "volume up" button transmission. For example, a single packet or burst could contain two commands—a "channel up" command and a "volume up" command. Further, from 2 seconds to 4 seconds the remote control 300 would send transmissions every 150 ms which include the data that would have been in the "volume up" button transmission along with data that is in the "channel up" button transmission. By combining the data in these transmissions into a single transmission, the remote control 300 may only have to transmit once for a fraction of a second longer which may result in conserving battery life compared with transmitting the two transmissions.

The discussion above uses a timeout value to govern repeat transmissions from the remote control. In alternative embodiments, the repeat transmission behavior can be handled by the device being controlled, such that the remote control need only transmit a signal indicating that a particular button remains held. A set of instructions on the controlled device (e.g., a gateway, TV, STB, DVR, etc.) may interpret the held button in a similar manner as described above, and the repeating command in step 411 may be an internal software command used by whatever application is running. For example, a repeat command may involve making another software call to a routing indicating that the button was pressed again.

As noted above, the features herein can be used with a two-way remote. A one-way remote control may also be used. According to aspects of the disclosure, the one-way remote control may include one or more different modes (e.g., the different modes may be stored in a memory of the remote control). Further, the remote control may be configured to be selectively alternated between the one or more different modes. For example, in the example described above, wherein the user device is running a program guide application, the user may configure the remote control to operate under a first mode wherein the repeat transmission behavior of the buttons of the remote control operates according to the first mode. For example, the user may activate the first mode by pressing a button on the remote control labeled "program guide" which configures the remote control to operate under a first mode which is associated with the program guide application. Further, in the example described above, wherein the user device is running a game application, the user may configure the remote control to operate under a second mode wherein the repeat transmission behavior of the buttons of the remote control operates according to the second mode. For example, the user may activate the second mode by pressing a button on the remote control labeled "game" which configures the remote control to operate under a second mode which is associated with the video game application. Other modes may be used as desired. According to aspects of the disclosure, one or more modes may be installed on a remote control 300 during manufacturing of the remote control 300, or loaded during a user installation process. For example, the modes may be stored in a read only memory (ROM) or may be stored in a memory wherein the modes may be modified or deleted.

It is noted that various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. A method comprising:
   determining, by a remote control device comprising a plurality of inputs, a first continuous press of a first input of the plurality of inputs;
   determining that the first continuous press is intended for a first application running on a first device;
   retrieving, from a memory of the remote control device, a first rate of transmission corresponding to the first input and based on characteristics of the first application running on the first device;

sending, based on the first rate of transmission, a plurality of first transmissions resulting from the first continuous press of the first input;

determining, by the remote control device, a second continuous press of a second input of the plurality of inputs;

determining that the second continuous press is intended for a second application running on a second device, wherein the first application is distinct from the second application;

retrieving, from the memory of the remote control device, a second rate of transmission corresponding to the second input and based on characteristics of the second application of the second device, wherein the second rate of transmission is distinct from the first rate of transmission; and in response to determining that the first input and the second input correspond to pressing of a same button on the remote control device:

sending, based on the first rate of transmission, a plurality of first transmissions resulting from the first continuous press of the first input to the first device, and sending, based on the second rate of transmission, a plurality of second transmissions resulting from the second continuous press of the second input to the second device that is distinct from the first device.

2. The method of claim 1, wherein the remote control device is a touch screen device and the button is a touch surface on a touch-sensitive display screen.

3. The method of claim 1, wherein one or more of the first rate of transmission or the second rate of transmission is sent based on a timeout value, and wherein the timeout value defines a maximum amount of transmissions for a time period.

4. The method of claim 1, wherein the first input comprises a volume input and the second input comprises a channel input.

5. The method of claim 4, wherein the first continuous press of the volume input causes an increase or decrease to a volume of a device and wherein the second continuous press of the channel input causes a change to a channel of the device.

6. The method of claim 1, further comprising receiving an instruction to change a mode of operation of the remote control device, wherein the instruction is indicative of a change of an application running on a device.

7. The method of claim 1, wherein a timeout value is based on a mode of operation of the remote control device.

8. A remote control device, comprising:
one or more processors;
a plurality of input interfaces in communication with the one or more processors; and memory storing processor executable instructions that, when executed by the one or more processors, cause the remote control device to:
determine a first continuous press of a first input of a plurality of inputs;
determine that the first continuous press is intended for a first application running on a first device;
retrieve, from a memory of the remote control device, a first rate of transmission corresponding to the first input and based on characteristics of the first application running on the first device;
send, based on the first rate of transmission, a plurality of first transmissions resulting from the first continuous press of the first input;

determine a second continuous press of a second input of the plurality of inputs;

determine that the second continuous press is intended for a second application running on a second device, wherein the first application is distinct from the second application;

retrieve, from the memory of the remote control device, a second rate of transmission corresponding to the second input and based on characteristics of the second application of the second device, wherein the second rate of transmission is distinct from the first rate of transmission; and in response to determining that the first input and the second input correspond to pressing of a same button on a remote control device:

send, based on the first rate of transmission, a plurality of first transmissions resulting from the first continuous press of the first input to the first device, and send, based on the second rate of transmission, a plurality of second transmissions resulting from the second continuous press of the second input to the second device that is distinct from the first device.

9. The remote control device of claim 8, further comprising a touch-sensitive display, wherein the plurality of inputs comprise a plurality of graphical buttons displayed on the touch-sensitive display.

10. The remote control device of claim 8, wherein the processor executable instructions, that when executed by the one or more processors, cause the apparatus to receive an instruction to send the plurality of first transmissions or to send the plurality of second transmissions causes the apparatus to send the plurality of first transmissions or to send the plurality of second transmissions based on a timeout value, wherein the timeout value defines a maximum amount of transmissions for a time period.

11. The remote control device of claim 8, wherein the first input comprises a volume input and the second input comprises a channel input.

12. The remote control device of claim 11, wherein the first continuous press of the volume input causes an increase or decrease to a volume of a remote control device and wherein the second continuous press of the channel input causes a change to a channel of the remote control device.

13. The remote control device of claim 8, wherein the processor executable instructions, when executed by the one or more processors, further cause the apparatus to receive an instruction to change a mode of operation of the apparatus, wherein the instruction is indicative of a change of an application running on a remote control device.

14. The remote control device of claim 8, wherein a timeout value is based on a mode of operation of the apparatus.

15. A non-transitory computer-readable medium storing processor executable instructions that, when executed by at least one remote control device, cause the at least one remote control device to:
determine a first continuous press of a first input of a plurality of inputs;
determine that the first continuous press is intended for a first application running on a first device;
retrieve, from a memory of the remote control device, a first rate of transmission corresponding to the first input and based on characteristics of the first application running on the first device;
send, based on the first rate of transmission, a plurality of first transmissions resulting from the first continuous press of the first input;

determine a second continuous press of a second input of the plurality of inputs;

determine that the second continuous press is intended for a second application running on a second device, wherein the first application is distinct from the second application;

determine, based on the second input and based on characteristics of the second application of the second device, a second rate of transmission; and retrieve, from the memory of the remote control device, a second rate of transmission corresponding to the second input, wherein the second rate of transmission is distinct from the first rate of transmission; and in response to determining that the first input and the second input correspond to pressing of a same button on a remote control device:

send, based on the first rate of transmission, a plurality of first transmissions resulting from the first continuous press of the first input to the first device, and send, based on the second rate of transmission, a plurality of second transmissions resulting from the second continuous press of the second input to the second device that is distinct from the first device.

16. The non-transitory computer-readable medium of claim 15, wherein the processor executable instructions that, when executed by the at least one remote control device, cause the at least one remote control device to determine the first continuous press or to determine the second continuous press causes the at least one remote control device to receive a touch on a touch-sensitive display screen.

17. The non-transitory computer-readable medium of claim 15, wherein the processor executable instructions that, when executed by the at least one remote control device, cause the at least one remote control device to send the plurality of first transmissions or to send the plurality of second transmissions causes the at least one remote control device to send the plurality of first transmissions or to send the plurality of second transmissions based on a timeout value, wherein the timeout value defines a maximum amount of transmissions for a time period.

18. The non-transitory computer-readable medium of claim 15, wherein the first input comprises a volume input and the second input comprises a channel input.

19. The non-transitory computer-readable medium of claim 15, wherein the processor executable instructions, when executed by the at least one remote control device, further cause the at least one remote control device to receive an instruction to change a mode of operation of the remote control device, wherein the instruction is indicative of a change of an application running on a device.

20. The non-transitory computer-readable medium of claim 15, wherein a timeout value is based on a mode of operation of the at least one remote control device.

21. The method of claim 1, wherein the first device is operated in a gaming mode and the second device is operated in a program guide mode and the first rate of transmission to the first device is at a higher rate of transmission than the second rate of transmission to the second device.

* * * * *